(12) United States Patent
Miracle

(10) Patent No.: US 11,046,124 B2
(45) Date of Patent: Jun. 29, 2021

(54) PNEUMATIC TIRE

(71) Applicant: Bridgestone Americas Tire Operations, LLC, Nashville, TN (US)

(72) Inventor: Tanya L. Miracle, Uniontown, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 250 days.

(21) Appl. No.: 16/327,952

(22) PCT Filed: Aug. 21, 2017

(86) PCT No.: PCT/US2017/047730
§ 371 (c)(1),
(2) Date: Feb. 25, 2019

(87) PCT Pub. No.: WO2018/044605
PCT Pub. Date: Mar. 8, 2018

(65) Prior Publication Data
US 2019/0202246 A1   Jul. 4, 2019

Related U.S. Application Data

(60) Provisional application No. 62/381,354, filed on Aug. 30, 2016.

(51) Int. Cl.
*B60C 15/06* (2006.01)
(52) U.S. Cl.
CPC .......... *B60C 15/0607* (2013.01); *B60C 15/06* (2013.01); *B60C 15/0603* (2013.01); *B60C 2015/061* (2013.01)

(58) Field of Classification Search
CPC ..... B60C 15/00; B60C 15/06; B60C 15/0603; B60C 15/0607; B60C 2015/061
See application file for complete search history.

(56) References Cited

U.S. PATENT DOCUMENTS 9,193,220 B2   11/2015   Michelin
9,205,709 B2   12/2015   Michelin
9,248,703 B2    2/2016   Michelin
(Continued)

FOREIGN PATENT DOCUMENTS

EP         251145  *  1/1988
EP       1201463 A2   5/2002
(Continued)

OTHER PUBLICATIONS

JP 7-8602, 1995.*

*Primary Examiner* — Justin R Fischer

(57) ABSTRACT

The various embodiments relate to pneumatic tires including a changing radius of curvature along a body ply that defines a tapering point of a bead assembly. The tires further include a reinforcement band and a body ply with a turn-up end. Various embodiments further relate to a bead assembly that tapers to a width at about 20 mm to 30 mm from the bottom of the bead assembly, such that the ratio of the tapered width to the width of the bead assembly at the widest point of the bead bundle is from about 0.3 to about 0.5. The bead assembly includes a first and a second bead filler where the volume of the first bead filler is from about 32% to about 44% of the bead filler.

10 Claims, 6 Drawing Sheets

(56) References Cited

U.S. PATENT DOCUMENTS

| | | | |
|---|---|---|---|
| 9,266,399 B2 | 2/2016 | Michelin | |
| 2001/0010246 A1* | 8/2001 | Itoi | B60C 15/0027 |
| | | | 152/540 |
| 2002/0157755 A1 | 10/2002 | Mani et al. | |
| 2014/0158272 A1* | 6/2014 | Bondu | B60C 15/0607 |
| | | | 152/541 |
| 2014/0360647 A1 | 12/2014 | Michelin | |
| 2015/0020945 A1 | 1/2015 | Michelin | |

FOREIGN PATENT DOCUMENTS

| | | | |
|---|---|---|---|
| JP | 60-88610 | * | 5/1985 |
| JP | 63251304 | * | 10/1988 |
| JP | 7-8602 | * | 2/1995 |
| WO | WO 2012/36292 | * | 3/2012 |

* cited by examiner

PNEUMATIC TIRE

TECHNICAL FIELD

Various embodiments disclosed herein relate generally to pneumatic tires and, more particularly, to the beads of pneumatic tires.

BACKGROUND

In general, the heavy duty pneumatic radial tire includes a main tire body reinforcement including a body ply composed of at least one ply arranged in the radial direction and a tread reinforcement including a belt composed mainly of at least two layers of metal cords superimposed about a crown portion of the body ply. The body ply cords are crossed with each other at a small inclination angle with respect to the equatorial plane of the tire. The tire further includes a bead portion reinforcement including a layer of metal cords obliquely arranged along the turn-up portion of the body ply and wound around a bead core in each of the bead portions.

The bead core includes a bead bundle surrounded by a hard bead filler and a soft bead filler. The hard bead filler is a thick, relatively stiff rubber compound encasing the bead bundle and positioning the bead bundle tightly against the wheel flange. The hard bead filler minimizes flexing and movement. The soft bead filler provides a strong, flexible, resilient junction between the relatively thin and flexible sidewalls and the much thicker, more rigid bead area.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments disclosed herein relate to a pneumatic tire that includes a body and a pair of bead assemblies which include a body ply disposed in the body. The body ply includes a body portion and turn up portion having a turn up end. The bead assemblies include a bead bundle and bead filler. The bead filler is provided between a main body of the body ply and a turned-up portion of the body ply turned up around the bead bundle, the bead filler extending from the bead bundle upwards in the radial direction. The bead assembly has a width BB across the widest part of the bead bundle. At a height BTH radially upwards from the radially innermost point of the bead assembly, the bead assembly has a width BTW. At a height BTH from about 20 mm to about 30 mm, the ratio of BTW to BB is from about 0.3 to about 0.5.

Various embodiments disclosed herein relate to a pneumatic tire that includes a first bead filler and a softer second bead filler, wherein the first bead filler comprises a volume from about 32% to about 44% of the total volume of bead filler in the tire. Various embodiments disclosed herein include the first bead filler at a volume from about 34% to about 38% of the total bead filler volume in the tire.

Various embodiments disclosed herein relate to a pneumatic tire that includes a bead filler, wherein the bead filler comprises from about 10 to about 20 lbs. Various embodiments disclosed herein include the first bead filler at a weight from about 35% to about 40% of the weight of the bead filler.

Various embodiments disclosed herein relate to a pneumatic tire that includes a body ply, wherein the body ply comprises a diameter from about 1.6 to about 2.5 mm. Various embodiments disclosed herein include the body ply at a diameter from about 1.75 to about 2.2 mm.

Various embodiments disclosed herein relate to a pneumatic tire that includes a body and a pair of bead assemblies disposed in the lower section of the body, the bead assemblies including a body ply disposed in the body. The body ply includes a body portion and a turn up portion having a turn up end. The bead assembly includes a bead bundle and a bead filler. The bead filler is provided between a main body of the body ply and a turned-up portion of the body ply turned up around the bead bundle, the bead filler extending from the bead bundle upwards in the radial direction. The bead filler has an axially outer side and an axially inner side. The bead filler axially outer side has a center of curvature axially inside of the body ply from the bottom of the bead bundle upwards to a point TT where the center of curvature is axially outside of the body ply. At point TT, the bead filler has a width BT and the bead assembly has a width BB across the widest width of the bead bundle. The ratio of BT to BB is about 0.3 to about 0.5.

Various embodiments disclosed herein relate to a pneumatic tire wherein point TT is from about 20 mm to about 30 mm above the axially innermost point of the bead assembly.

Various embodiments disclosed herein relate to a pneumatic tire that has a body and a pair of bead assemblies disposed in the lower section of the body, the bead assemblies including a body ply disposed in the body. The body ply includes a body portion and a turn up portion having a turn up end. The bead assembly includes a bead bundle and a bead filler. The bead filler is provided between a main body of the body ply and a turned-up portion of the body ply turned up around the bead bundle, the bead filler extending from the bead core upwards in the radial direction. The bead filler has an axially outer side and an axially inner side. The bead filler axially outside or the axially inner side has a center of curvature towards the center of the bead assembly from the bottom of the bead bundle upwards to a point TT where the center of curvature of the body ply is outside of the bead assembly. At point TT, the bead filler has a width BT. The bead assembly has a width BB across the widest width of the bead bundle such that the ratio of BT to BB is about 0.3 to about 0.5.

Various embodiments disclosed herein relate to a pneumatic tire that includes a body and a pair of bead assemblies disposed in the lower section of the body which include a body ply disposed in the body. The body ply includes a body portion and a turned up portion having a turned up end. The bead assembly includes a bead bundle and a bead filler. A reinforcement filler band is axially outside of the bead assembly. The bead filler is provided between a main body of the body ply and a turned-up portion of the body ply turned up around the bead bundle, the bead filler extending from the bead bundle upwards in the radial direction. The turned-up portion ends at a height TPH from the radially innermost point of the bead filler. TPH is from about 20% to about 25% of the tire height. The reinforcement filler band extends from a radially innermost end to a radially outermost end, the radially innermost end being at a height RFE from the radially inner most point of the bead filler. The radially outermost end of the reinforcement filler band is at a height RFH from the radially innermost point of the bead filler. RFE is from about 7% to about 10% of the tire height and RFH is from about 20% to about 25% of the tire height.

BRIEF DESCRIPTION OF THE DRAWINGS

In order to better understand various exemplary embodiments, reference is made to the accompanying drawings, wherein.

DETAILED DESCRIPTION

Figure 1:
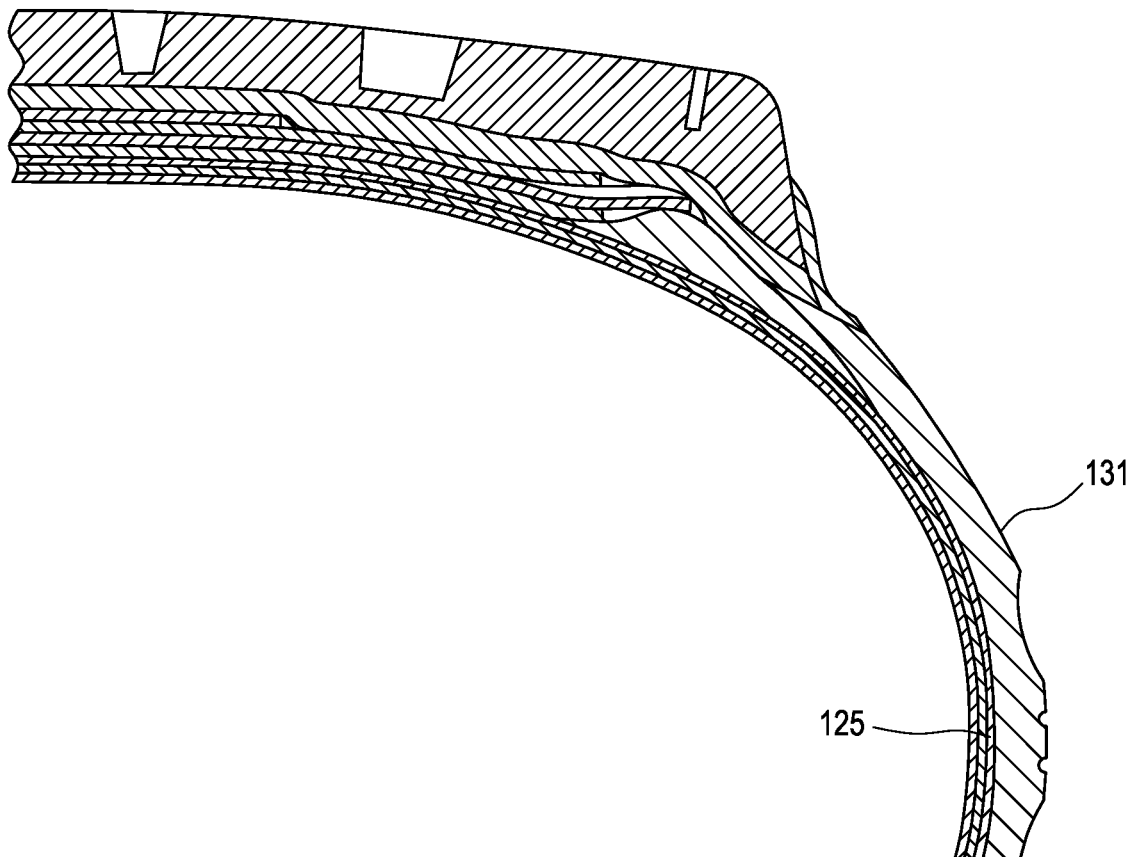
FIG. 1 shows a cross sectional view of half a standard pneumatic tire.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

The following includes definitions of selected terms employed herein. The definitions include various examples and/or forms of components that fall within the scope of a term. The examples are not intended to be limiting.

"Axial" or "axially" refer to a direction that is parallel to the axis of rotation of a tire.

"Radial" or "radially" refer to a direction perpendicular to the axis of rotation of the tire.

"Circumferential" and "circumferentially" refer to a direction extending along the perimeter of the surface of the tread parallel to the equatorial plane perpendicular to the axial direction of the tire.

"Equatorial plane" refers to the plane that is perpendicular to the tire's axis of rotation and passes through the center of the tire's tread.

"Sidewall" refers to that portion of the tire between the tread and the bead.

"Tread" refers to that portion of the tire that comes into contact with a surface under normal load.

Directions are also stated in this application with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" are used in connection with an element, the "upper" element is spaced closer to the tread than the "lower" element. Additionally, when relative directional terms such as "above" or "below" are used in connection with an element, an element that is "above" another element is closer to the tread than the other element. The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

The embodiments described herein provide for lower weight tires with improved rolling resistance and durability. The tire with improved rolling resistance will result in improved fuel economy. The tires further have reduced material costs, improving the overall cost of manufacturing the tires. The amount of bead filler used in the present tires is less than that in the prior art. Less bead filler increases flexibility of the tire at the point of contact with a rim, increasing the durability of the tire. With a reduced amount of bead filler, the tire is also a lower weight. The tire with less weight has improved rolling resistance. These tires may be particularly used for commercial trucks.

The reduced amount of bead filler in the tires as described herein is provided by tapering the bead filler at a point from about 20 mm to about 30 mm above the bead bundle. The taper is measured by the width of the bead filler at a point from about 20 mm to about 30 mm above the innermost point of the bead assembly as compared to the width of the bead assembly across the bead bundle. The ratio of the width at a tapering point to the width across the bead bundle is from about 0.3 to about 0.5. In various embodiments, the bead filler is part of a body ply that has a diameter of about 1.6 to about 2.5 mm, preferably from about 1.75 to about 2.2 mm.

Referring now to the drawings, in which like numerals refer to like components or steps, there are disclosed broad aspects of various exemplary embodiments. FIG. 1 is a cross sectional view showing a standard tire. The tire includes a body ply 125 that extends and wraps around a pair of bead assemblies. Half of the tire is depicted in FIG. 1 with the other half being a substantial mirror image of the half depicted. The body ply 125 includes a main body portion 123 and a turn up portion 124. Turn up portion 124 includes a radial outer end. The bead assembly is disposed in the body 131 of the tire.

The bead assembly includes bead bundle 115, first bead filler 114 and second bead filler 113. First bead filler 114 has a higher rubber hardness than second bead filler 113. First bead filler 114 and second bead filler 113 form a bead filler assembly. Each of first bead filler 114 and second bead filler 113 are made of rubber materials. A first portion of the first bead filler 112 surrounds bead bundle 115 and a second portion of the first bead filler 111 extends radially above the bead bundle 115. The first portion of the first bead filler 112 and the second portion of the first bead filler 111 are the same material. Second portion of the first bead filler 112 is generally located radially above first portion of the first bead filler 111. The bead filler assembly tapers towards a radially upper end. Turn up portion 124 is disposed along the edge of the bead filler assembly in a radially upwards direction.

A wire chafer 120 is disposed around the bead filler assembly, outside of the body ply 123. Further, an abrasion resistant material 121 is disposed around the wire chafer 120 and bead assembly. Reinforcement outer layer 122 is disposed axially outside of turn up portion 124 and axially inside of abrasion resistant material 121. The ratio of the volume of first bead filler 114 to second bead filler 113 is about 1 to about 4.

Figure 2:
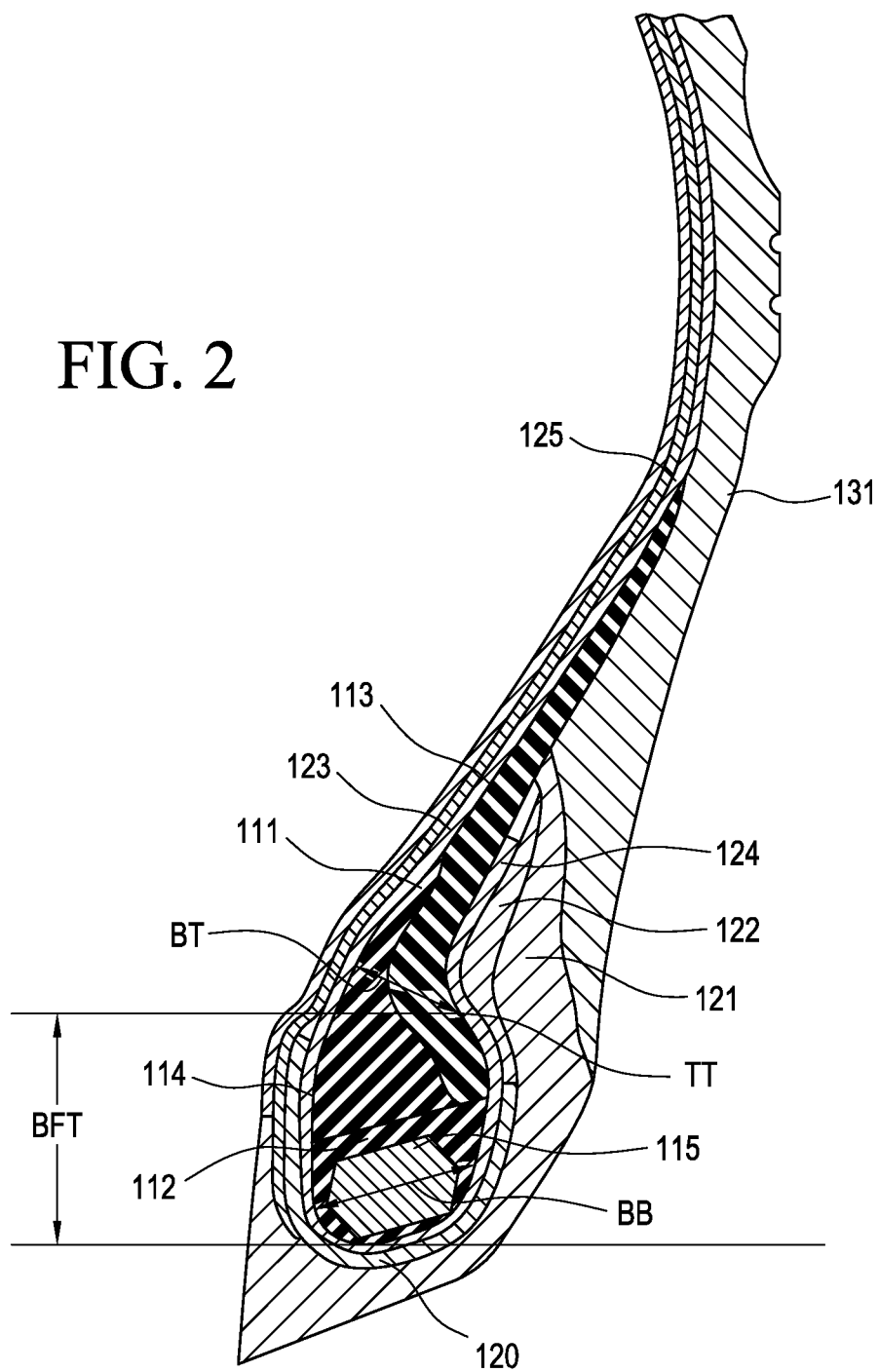
FIGS. 2 to 6 show cross sectional views of a portion of embodiments of a tire.
Figure 3:
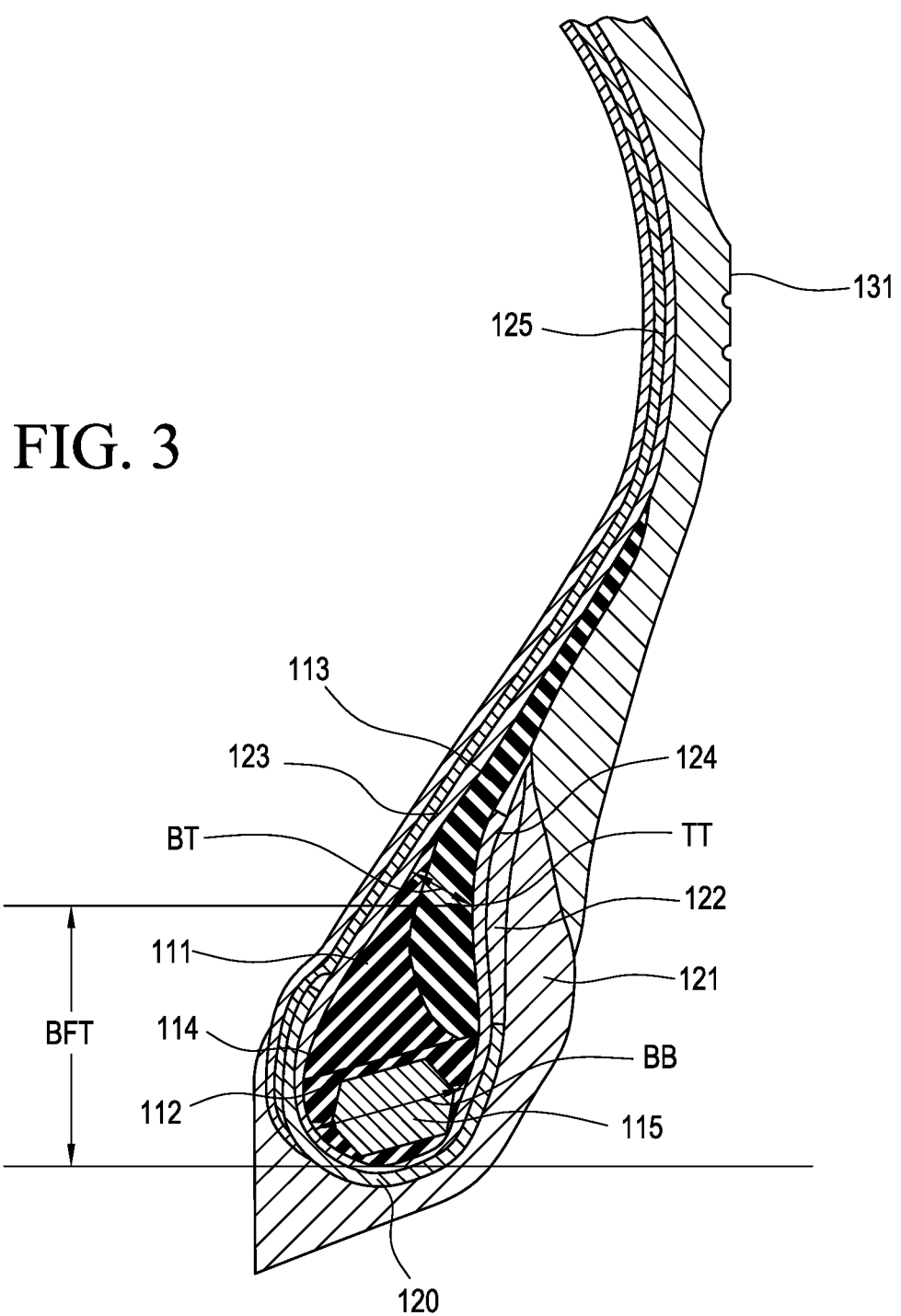

FIGS. 2 and 3 illustrate various embodiments of the tire. The various elements as labelled in FIGS. 2 and 3 have the same name and description as above. Turn up portion 124 extends upward axially outside of the bead filler assembly. The radius of curvature of the axially outer edge of the bead filler assembly extends to a center of curvature axially inside of the outer edge of the bead filler assembly moving upwards from the radially innermost point of the bead filler assembly. At point TT the center of curvature of the axially outer edge of the bead filler assembly changes from axially inside of the outer edge of the bead assembly to axially outside of the outer edge of the bead assembly. Point TT is at a height BFT from the radially innermost edge of the bead filler assembly. At point TT the bead filler assembly has a width BT. Width BT is measured as the shortest distance from point TT to the main body ply 123. Across the widest point of the bead bundle 115, the bead filler assembly has a width BB. The ratio of width BT to width BB is from about 0.3 to about 0.5. FIGS. 2 and 3 illustrate embodiments of the tire in which the bead filler is provided in various shapes.

In various embodiments, height BFT is from about 20 mm to about 30 mm. In various embodiments, the volume of the first bead filler 114 ranges from about 32% to about 44% of the volume of the bead filler in the bead filler assembly. Preferably, the volume of the first bead filler 114 ranges from about 34% to about 38% of the volume of the bead filler in the bead filler assembly. In various embodiments, the weight of the bead filler, including the first bead filler 114 and the second bead filler 113, ranges from about 10 lbs to about 20 lbs. Preferably, the weight of the first bead filler 114 ranges from about 35% to about 40% of the weight of the bead filler, including the first bead filler 114 and the second bead filler 113.

Figure 4:
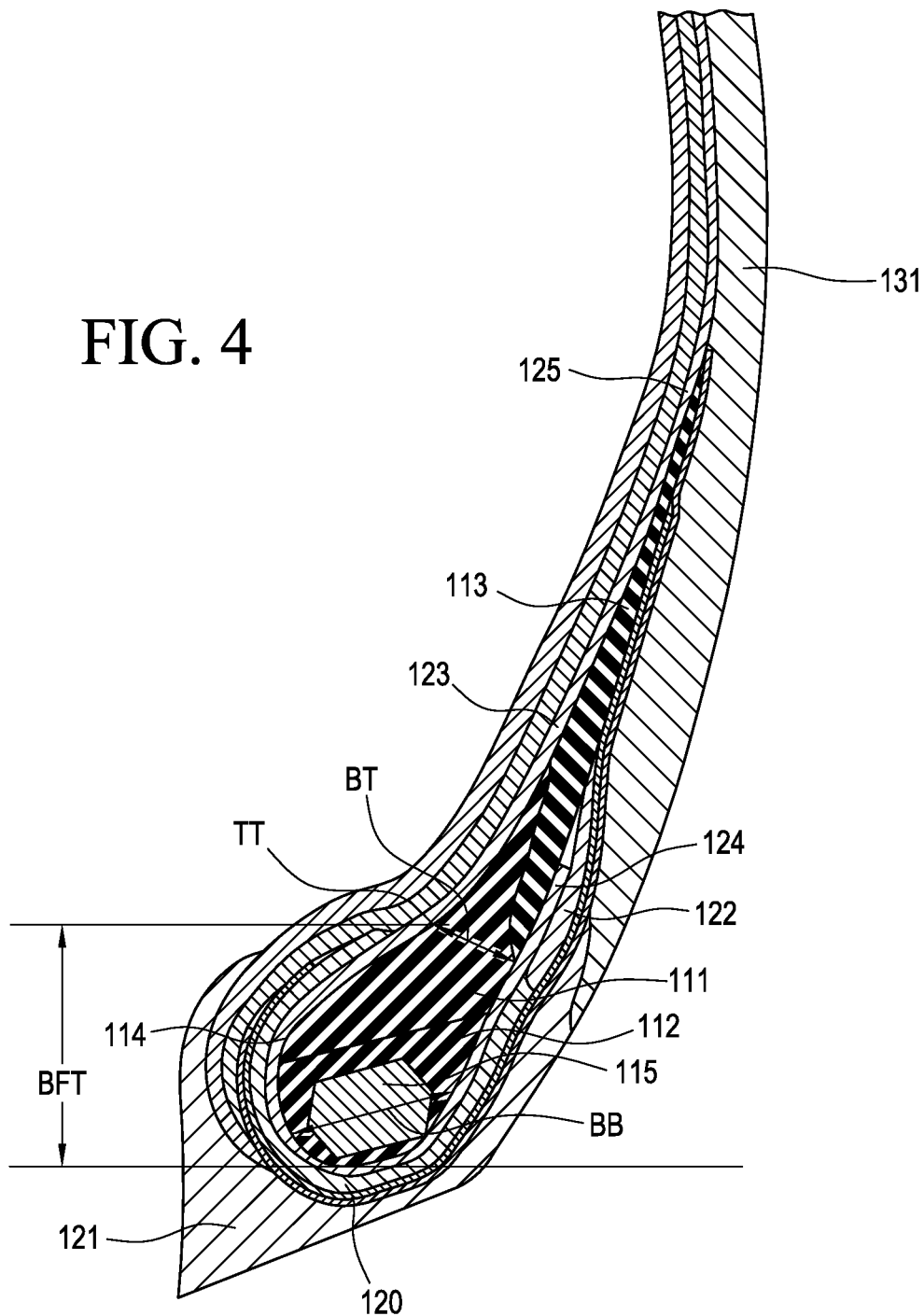

FIG. 4 illustrates another embodiment of the tire. The various elements as labelled in FIG. 4 have the same name and description as above. The embodiment illustrated in FIG. 4 includes a change in the center of curvature along the axially inner edge of the bead filler assembly. The axially inner edge of the bead filler assembly has a center of curvature that is axially outside of the axially inner edge moving upwards from the radially innermost point of the bead filler assembly. At point TT the center of curvature of the axially outer edge of the bead filler assembly changes from axially outside of the outer edge of the bead filler assembly to axially inside of the outer edge of the bead filler assembly. Point TT is at a height BFT from the radially innermost edge of the bead filler assembly. At point TT the bead filler assembly has a width BT. Width BT is measured as the shortest distance from point TT to the body ply 123. Across the widest point of the bead bundle 115, the bead filler assembly has a width BB. The ratio of width BT to width BB is from about 0.3 to about 0.5.

In various embodiments, height BFT is from about 20 mm to about 30 mm.

In various embodiments, the volume of the first bead filler 114 ranges from about 32% to about 44% of the volume of the bead filler in the bead filler assembly. Preferably, the volume of the first bead filler 114 ranges from about 34% to about 38% of the volume of the bead filler in the bead filler assembly.

Figure 5:
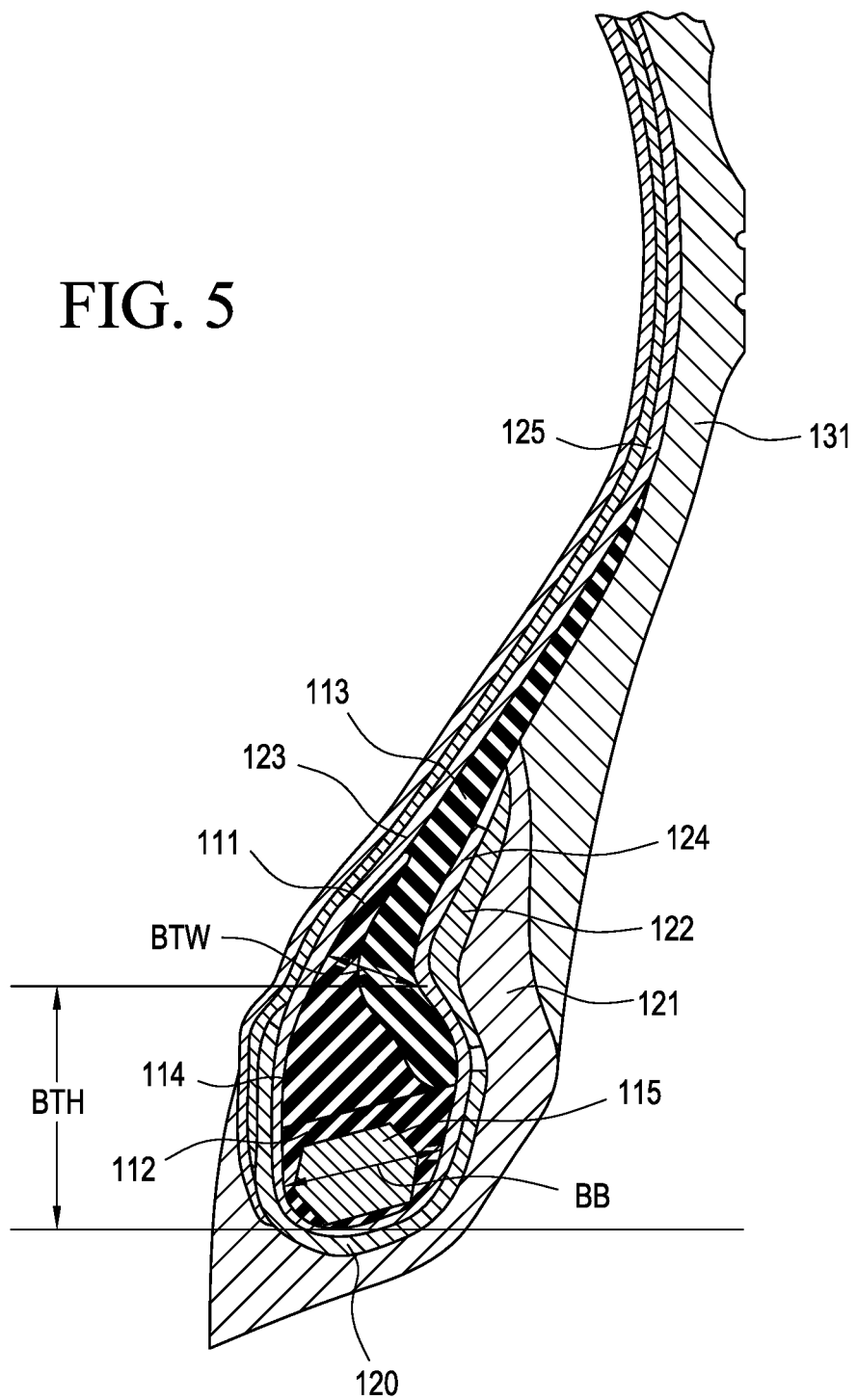

FIG. 5 illustrates another embodiment of the tire. The various elements as labelled in FIG. 5 have the same name and description as above. At height BTH from the innermost point of the bead filler assembly, the bead filler assembly has a width BTW. Width BTW is measured as the shortest distance across the bead filler assembly from a point along the edge of the bead filler assembly. At a height BTH from about 20 mm to about 30 mm, the ratio of width BTW to width BB is from about 0.3 to about 0.5.

In various embodiments, the volume of the first bead filler 114 ranges from about 32% to about 44% of the volume of the bead filler in the bead filler assembly. Preferably, the volume of the first bead filler 114 ranges from about 34% to about 38% of the volume of the bead filler in the bead filler assembly.

Figure 6:
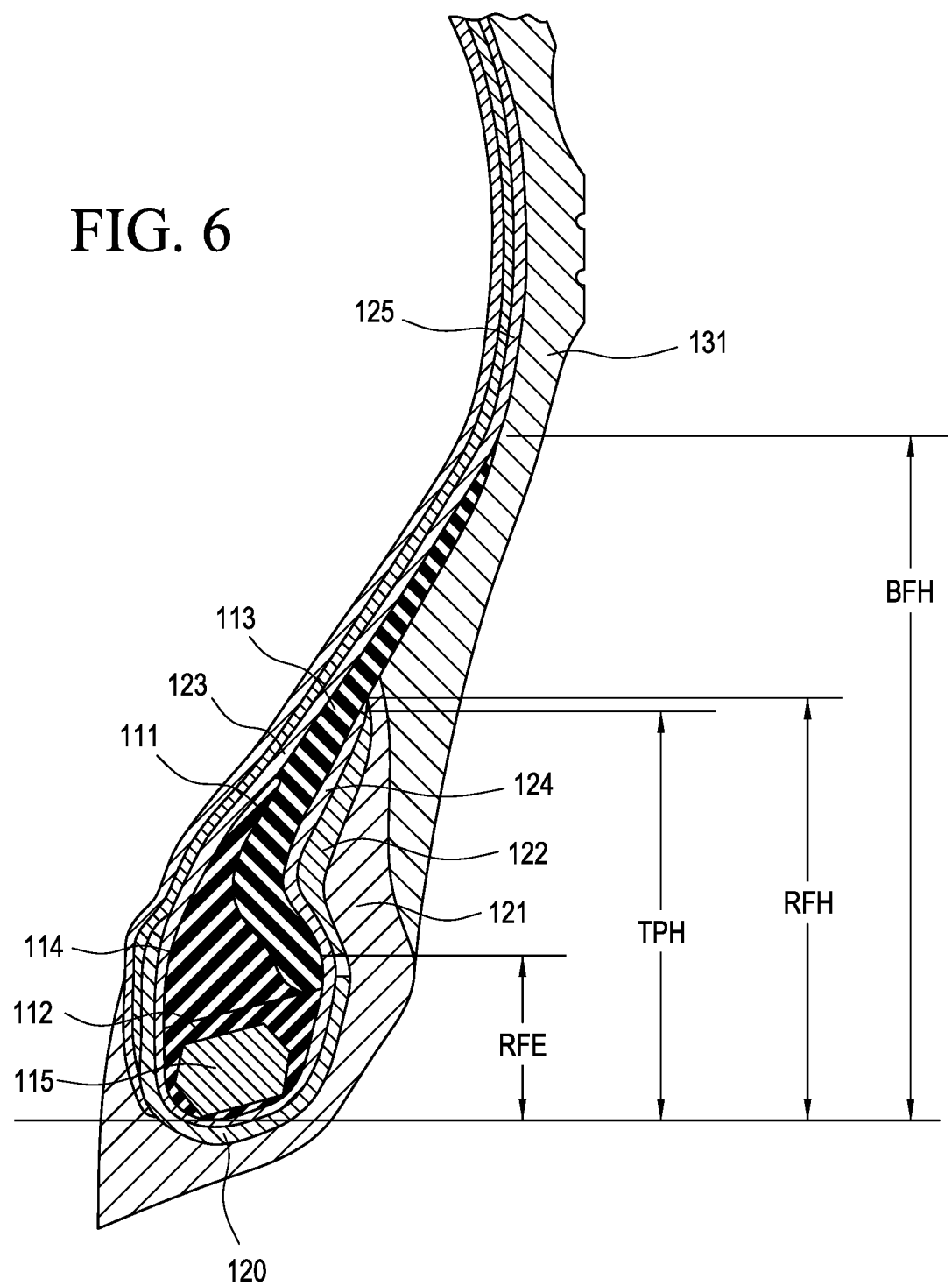

FIG. 6 illustrates another embodiment of the tire. The various elements as labelled in FIGS. 2 and 3 have the same name as above. Turn up portion 124 extends radially upwards to a height TPH from the radially innermost point of the bead filler assembly. Height TPH is from about 20% to about 25% of the tire height. The tire height is defined as the distance from the radially innermost point of the bead assembly to the radially outermost point of the tire tread when the tire is in place on a rim. Reinforcement filler band 122 extends from a radially innermost end to a radially outermost end. The reinforcement filler band 122 innermost end is at a height RFE from the radially innermost point of the bead assembly. Height RFE is from about 7% to about 10% of the tire height. The reinforcement filler band 122 outermost end is at a height RFH from the radially innermost point of the bead assembly. Height RFH is from about 20% to about 25% of the tire height. The bead filler assembly extends upwards to height BFH from the radially innermost point of the bead assembly.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A pneumatic tire, comprising:
    a body;
    a pair of bead assemblies disposed in a lower section of the body;
    a body ply disposed in the body, the body ply extending between the pair of bead assemblies;
    the body ply further comprising a main body portion and a turn-up portion having a turn-up end;
    each bead assembly comprising a bead bundle and a bead filler wherein the bead filler provided between the main body of the body ply and the turn-up portion of the body ply turned up around the bead bundle,
    the bead filler extending from the bead bundle toward an outer side of the bead assembly in the radial direction;
    the bead filler comprising a first rubber bead filler surrounding the bead bundle and a second rubber bead filler located outside of the first rubber bead filler, wherein rubber hardness of the first rubber bead filler is higher than the rubber hardness of the second bead filler;
    the bead filler having an axially outer side and an axially inner side, wherein center of curvature of the axially outer side of the bead filler changes from axially outside or the outer edge of the bead assembly to axially inside of the outer edge of the bead assembly at a point TT, wherein the point TT is from about 20 mm to about 30 mm from the radially innermost point of the bead assembly;
    wherein at point TT, the bead filler has a width BT, measured as the shortest distance across the bead filler from point TT to the body ply,
    wherein the bead assembly has a width BB across the widest width of the bead bundle, and
    wherein the ratio of BT to BB is about 0.3 to about 0.5.

2. The pneumatic tire of claim 1, wherein a volume of the first bead filler is from about 32% to about 44% of a volume of the bead filler.

3. The pneumatic tire of claim 2, wherein the volume of the first bead filler is from about 34% to about 38% of the volume of the bead filler.

4. The pneumatic tire of claim 1, wherein the bead filler comprises from about 10 to about 20 lbs.

5. The pneumatic tire of claim 1, wherein the weight of the first bead filler is from about 35% to about 40% of the weight of the bead filler.

6. A pneumatic tire, comprising:
a body;
a pair of bead assemblies disposed in the lower section of the body;
a body ply disposed in the body, the body ply extending between the pair of bead assemblies, the body ply including a main body portion and a turn-up portion having a turn-up end;
each bead assembly comprising a bead bundle and a bead filler; and
a reinforcement filler band axially outside of the bead assembly, wherein
the bead filler is provided between the main body of the body ply and the turn-up portion of the body ply turned up around the bead bundle,
the bead filler extends from the bead bundle toward an outer side of the bead assembly in the radial direction,
the turn-up portion end being at a height TPH from the radially innermost point of the bead filler,
TPH is from about 20% to about 25% of the tire height, and
the reinforcement filler band extends from a radially innermost end to a radially outermost end, the radially innermost end of the reinforcement filler band being a height RFE from the radially innermost point of the bead filler, the radially outermost end of the reinforcement filler band being a height RFH from the radially innermost point of the bead filler, and
RFE is from about 7% to about 10% of the tire height and RFH is from about 20% to about 25% of the tire height,
wherein the bead filler comprises a first rubber bead filler surrounding the bead bundle and a second rubber bead filler located outside of the first rubber bead filler, and a volume of the first bead filler is from about 32% to about 44% of a volume of the bead filler.

7. The pneumatic tire of claim 6, wherein a rubber hardness of the first rubber bead filler is higher than the rubber hardness of the second bead filler.

8. The pneumatic tire of claim 6, wherein the volume of the first bead filler is from about 34% to about 38% of the volume of the bead filler.

9. The pneumatic tire of claim 6, wherein the weight of the first bead filler is from about 35% to about 40% of the weight of the bead filler.

10. The pneumatic tire of claim 6, wherein the bead assembly has a width BB at the widest width of the bead bundle and a width BTW measured as the shortest distance across the bead assembly from a point on an edge of the bead filler at a distance BTH from the radially innermost point of the bead assembly, wherein at a BTH from about 20 mm to about 30 mm, the ratio of BTW to BB is from about 0.3 to about 0.5.

* * * * *